(12) United States Patent
Asada

(10) Patent No.: US 7,113,209 B2
(45) Date of Patent: Sep. 26, 2006

(54) IMAGE TAKING APPARATUS CAPABLE OF OPTICALLY AND ELECTRICALLY CHANGING MAGNIFICATION OF TAKEN IMAGES

(75) Inventor: Satoshi Asada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 714 days.

(21) Appl. No.: 10/062,516

(22) Filed: Feb. 5, 2002

(65) Prior Publication Data

US 2002/0109781 A1    Aug. 15, 2002

(30) Foreign Application Priority Data

Feb. 9, 2001    (JP) .............. 2001-034122

(51) Int. Cl.
*H04N 5/225*    (2006.01)

(52) U.S. Cl. .............. 348/240.1; 348/240.99; 348/240.2; 348/240.3

(58) Field of Classification Search .......... 348/240.1, 348/240.99, 240.2, 240.3, 374, 335, 349, 348/345; 396/90, 85, 86, 378, 379, 374, 396/88

See application file for complete search history.

(56) References Cited

U.S. PATENT DOCUMENTS 4,951,075 A * 8/1990 Tokumaru et al. ............ 396/78
5,420,632 A * 5/1995 Yamagiwa ................ 348/240.3
6,289,178 B1 * 9/2001 Kazami ........................ 396/60
6,757,013 B1 * 6/2004 Matsuzaka ................ 348/240.1

FOREIGN PATENT DOCUMENTS

| JP | 3-198481 | 8/1991 |
|---|---|---|
| JP | 6-86131 | 3/1994 |
| JP | 8-275042 | 10/1996 |
| JP | 10042183 A * | 2/1998 |
| JP | 11-177871 | 7/1999 |

OTHER PUBLICATIONS

JP 08275042 A (Translation of Specifications).*
JP 03198481 A (Abstract translation).*
JP 06086131 A (Abstract translation).*

* cited by examiner

*Primary Examiner*—Wendy R. Garber
*Assistant Examiner*—Nelson D Hernandez
(74) *Attorney, Agent, or Firm*—Fitzpatrick, Cella, Harper & Scinto

(57) ABSTRACT

An apparatus, a control method, and a control program which permit a first change operation of optically changing magnifications of a taken image and a second change operation of changing the magnifications by signal processing and in which a predetermined restriction that is not imposed on transition from the second change operation to the first change operation is imposed on transition from the first change operation to the second change operation.

1 Claim, 4 Drawing Sheets

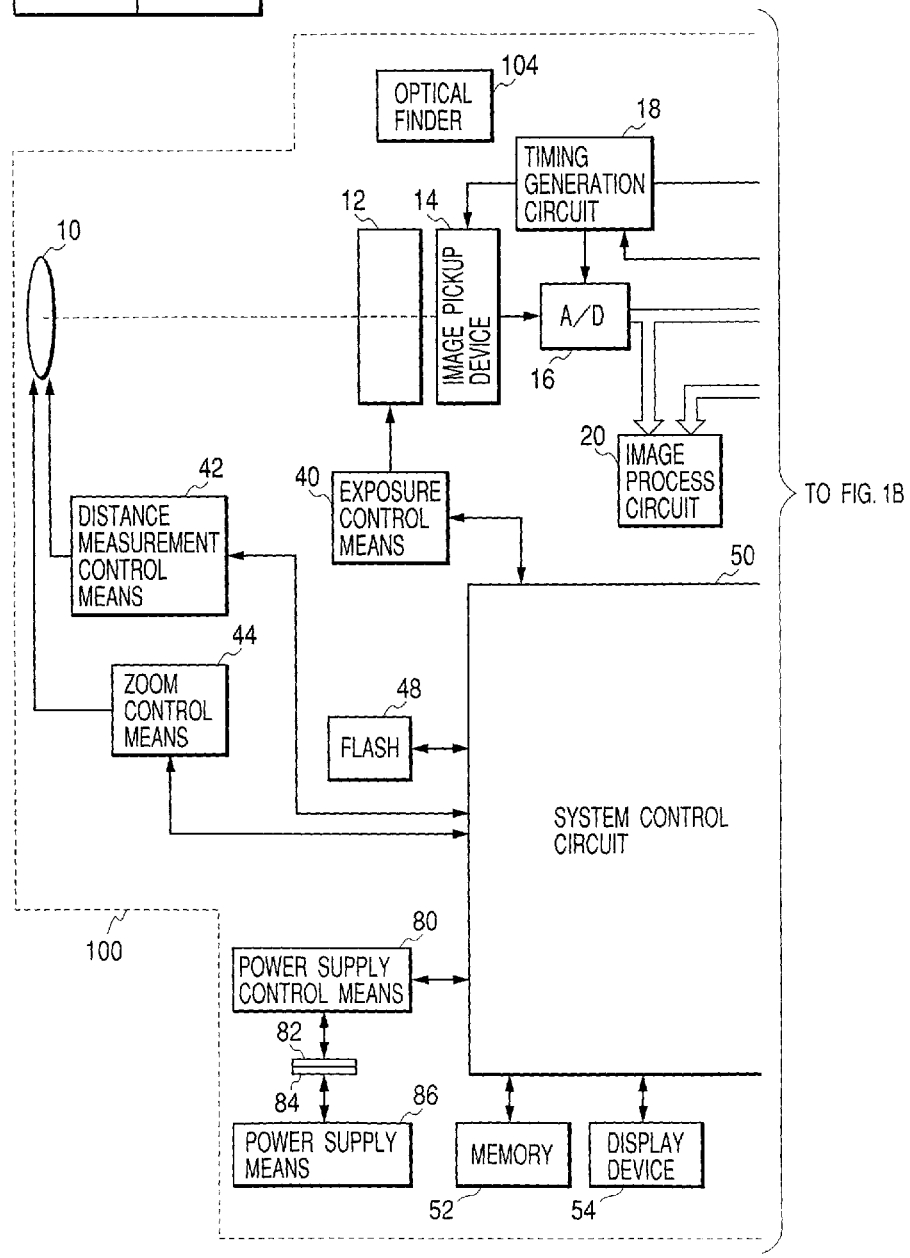

IMAGE TAKING APPARATUS CAPABLE OF OPTICALLY AND ELECTRICALLY CHANGING MAGNIFICATION OF TAKEN IMAGES

BACKGROUND OF THE INVENTION

1. Field of the Invention

The present invention relates to an image taking apparatus adapted to take images and, more particularly, to an image taking apparatus capable of optically and electrically changing magnifications of taken images.

2. Related Background Art

For using the optical zoom function and the electric zoom function in combination in an image taking apparatus, the conventional apparatus was constructed adopting a method of moving the lens to the optical tele-photo end through use of a zoom lever and effecting setting and movement of the electric zoom function on the basis of some operation, e.g., keeping further pushing the zoom lever. On the other hand, since images taken through use of the electric zoom function are worse in image quality, there are also users disliking easily activating the electric zoom function. Therefore, instead of immediately effecting setting or cancellation in response to a continuous push of the zoom lever for setting or canceling the electric zoom function, some contrivance for so-called prevention of an incorrect operation was employed; for example, the electric zoom function was not switched on or off without any operation such as a continuous push of the lever over a fixed period of time or an operation of once releasing the lever and again pushing the lever.

However, the foregoing method was advantageous in the setting of the electric zoom function in view of the deterioration of the image quality with use of the electric zoom function, but it also involved a problem that the operation was rather troublesome on the occasion of canceling the electric zoom function, because there occurred no deterioration of the image quality in that case.

SUMMARY OF THE INVENTION

An object of the present invention is to provide apparatus, a control method, and a control program with excellent expediency and high reliability by enabling such switching operation between the optical zoom function and the electric zoom function that a function for prevention of an incorrect operation is provided for setting of the electric zoom function from the optical zoom area and that a simpler operation can cancel the electric zoom function to bring the zoom function back into the optical zoom area.

For achieving the above object, one aspect of the present invention is to provide an apparatus, a control method, and a control program permitting a first change operation of optically changing magnifications of a taken image and a second change operation of changing the magnifications by signal processing, wherein a predetermined restriction that is not imposed on transition from the second change operation to the first change operation is imposed on transition from the first change operation to the second change operation.

Other aspects of the present invention will become apparent from the description of the preferred specific embodiments described hereinafter.

DETAILED DESCRIPTION OF THE PREFERRED EMBODIMENTS

The preferred embodiments of the present invention will be described below in detail with reference to the drawings.

First Embodiment

Figure 1B:
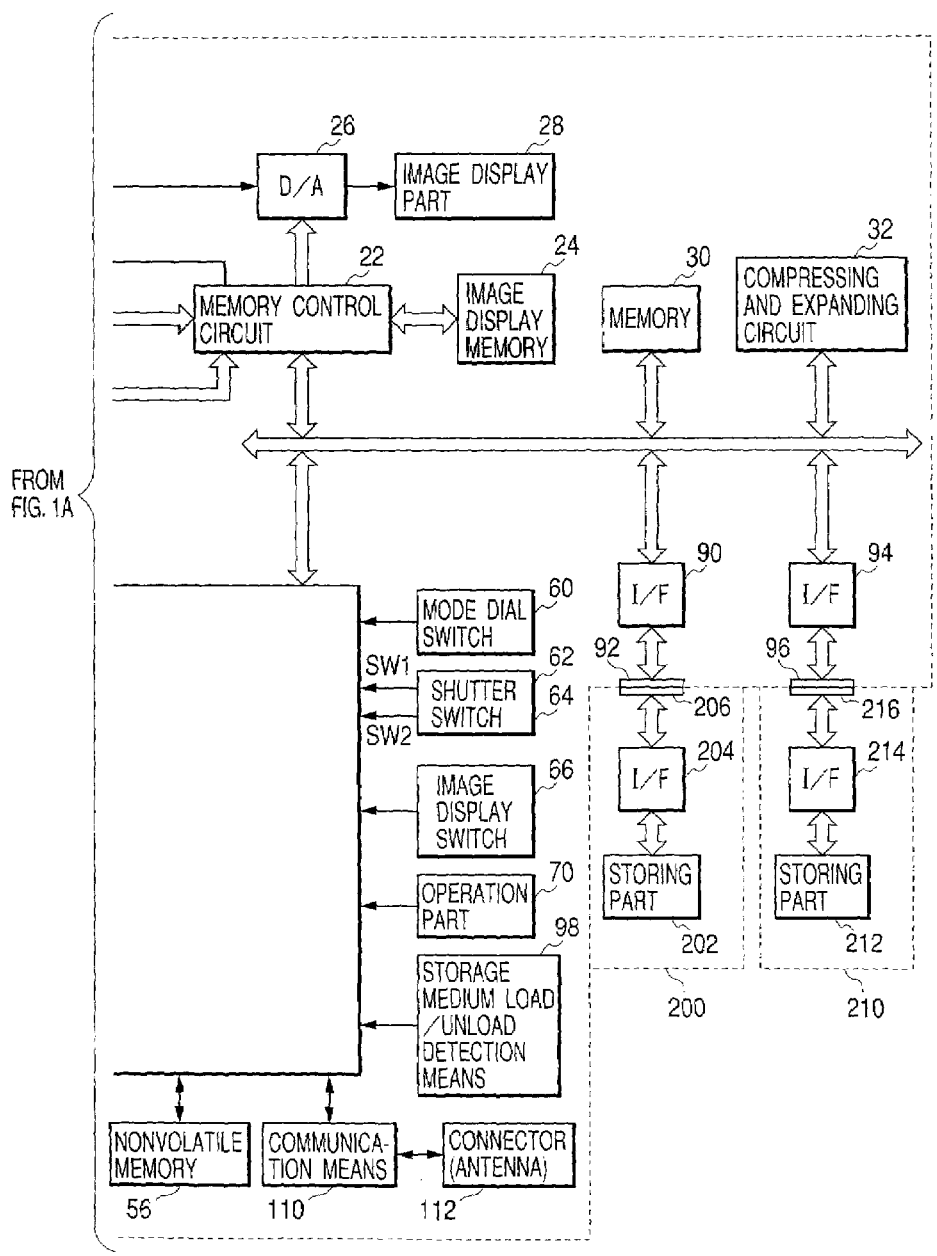
FIG. 1, which is comprised of FIGS. 1A and 1B, is a block diagram showing the structure of an image taking apparatus in an embodiment of the present invention.

FIGS. 1A and 1B are block diagrams to show the principal structure of the image taking apparatus according to the first embodiment.

In FIGS. 1A and 1B, reference numeral 100 designates an image processing apparatus.

Numeral 10 denotes a taking lens, 12 a shutter having the stop function, 14 an image pickup device for converting an optical image into an electric signal, and 16 an A/D converter for converting an analog signal output from the image pickup device 14 into a digital signal.

Numeral 18 represents a timing generation circuit for supplying clock signals and control signals to A/D converter 16 and D/A converter 26, and the timing generation circuit 18 is controlled by memory control circuit 22 and system control circuit 50.

Numeral 20 designates an image process circuit, which performs predetermined pixel interpolation and color conversion processes for data from the A/D converter 16 or data from the memory control circuit 22. Further, the image process circuit 20 performs extraction and enlargement processes of an image to implement the electric zoom function.

The image process circuit 20 performs predetermined arithmetic operations with use of taken image data and, based on the arithmetic results obtained, the system control circuit 50 performs the AF (autofocus) process of the TTL (through the lens) method, the AE (automatic exposure) process, and the EF (flash pre-emission) process to control exposure control means 40 and distance measurement control means 42.

Further, the image process circuit 20 also performs a predetermined arithmetic operation with use of the taken image data to execute the AWB (auto white balance) process of the TTL method based on the arithmetic result obtained.

Numeral 22 indicates a memory control circuit, which controls the A/D converter 16, timing generation circuit 18, image process circuit 20, image display memory 24, D/A converter 26, memory 30, and compressing and expanding circuit 32.

The data from the A/D converter 16 is written through the image process circuit 20 and the memory control circuit 22 or directly through the memory control circuit 22 into the image display memory 24 or into the memory 30.

Numeral 24 denotes an image display memory, 26 a D/A converter, and 28 an image display part consisting of a TFT LCD or the like. The image data for display written in the image display memory 24 is read through the D/A converter 26 to be displayed on the image display part 28.

By sequentially displaying taken image data through use of the image display part 28, it is feasible to implement the electronic finder function.

The image display part 28 is configured to be able to arbitrarily turn its display on or off in response to a command from the system control circuit 50, thereby permitting great decrease of power consumption of the image processing apparatus 100 during off periods of display.

Numeral 30 denotes a memory for storing still images and moving images taken, which has a storage capacity enough to store a predetermined number of still images or moving images for a predetermined time.

The memory 30 can also be used as a working area of the system control circuit 50.

Numeral 32 denotes a compressing and expanding circuit for compressing or expanding the image data by the adaptive discrete cosine transform (ADCT) or the like, which reads an image stored in the memory 30, performs the compressing process or the expanding process of the image, and writes the resultant data from the process into the memory 30. The data is stored together with information about taking conditions of the image data, e.g., information about date and time of photography, continuous shooting, panorama photography, and so on, into a storage medium described hereinafter.

Numeral 40 represents exposure control means for controlling the shutter 12 having the stop function, which has a flash light controlling function in cooperation with flash 48.

Numeral 42 stands for distance measurement control means for controlling focusing of the taking lens 10, and 44 zoom control means for controlling zooming of the taking lens 10.

Numeral 48 designates a flash device, which also has an AF auxiliary light projecting function and a flash light control function.

The exposure control means 40 and distance measurement control means 42 are controlled by the TTL method, and the system control circuit 50 controls the exposure control means 40 and the distance measurement control means 42, based on the results of arithmetic operations to process the taken image data in the image process circuit 20.

Numeral 50 indicates a system control circuit for controlling the whole of the image processing apparatus 100, and 52 a memory for storing constants, variables, programs, etc., for the action of the system control circuit 50.

Numeral 54 denotes a display device such as a liquid crystal display device, loudspeakers, etc., for indicating an operating state, a message, etc., by use of characters, images, voice, etc. in accordance with execution of the programs in the system control circuit 50, which is located at a single place or at plural places to allow easy recognition near the operation part of the image processing apparatus 100; e.g., the display device is comprised of a combination of an LCD, LEDs, sound generating devices, and so on.

Part of the functions of the display device 54 are installed in optical finder 104.

Among the display contents of the display device 54, those to be displayed on the LCD or the like include a single shot/continuous shot photography indication, a self timer indication, a compression rate indication, a number-of-recording-pixels indication, a number-of-recorded-images indication, a number-of-remaining-shots indication, a shutter speed indication, an aperture value indication, an exposure correction indication, a flash indication, a red-eye reduction indication, a macro photography indication, a buzzer setting indication, a clock battery remaining quantity indication, a battery remaining quantity indication, an error indication, an information indication with numerals of plural digits, a load/unload state indication of storage media 200 and 210, a communication I/F operation indication, a date and time indication, and so on.

Among the display contents of the display device 54, those to be displayed in the optical finder 104 include a focus indication, a hand shake warning indication, a flash charge indication, a shutter speed indication, an aperture value indication, an exposure correction indication, and so on.

Numeral 56 denotes an electrically erasable or recordable nonvolatile memory, which is, for example, an EEPROM or the like.

Numerals 60, 62, 64, 66, and 70 are operation means for input of various operation instructions into the system control circuit 50, and they are comprised of a switch, a dial, a touch panel, pointing based on detection of a visual axis, a voice recognition device, or the like alone or in combination.

These operation means will be described below in detail.

Numeral 60 designates a mode dial switch, which permits setting of each function mode by switching among power off, an automatic photography mode, a photography mode, a panorama photography mode, a reproduction mode, a multi-window reproducing-erasing mode, a PC connection mode, and so on.

Numeral 62 denotes a shutter switch SW1, which is switched on at a middle point of unrepresented shutter button operation of shutter button 1 in FIG. 2, described hereinafter, to issue instructions for starting the operations of the AF (autofocus) process, AE (automatic exposure) process, AWB (auto white balance) process, EF (flash pre-emission) process, and so on.

Numeral 64 represents a shutter switch SW2, which is switched on upon completion of the operation of the shutter button 1 in FIG. 2, described hereinafter, to issue instructions for starting the sequential processing operations such as the exposure process to write image data of the signal read from the image pickup device 12 through the A/D converter 16 and memory control circuit 22 into the memory 30, the development process using the arithmetic operations in the image process circuit 20 and the memory control circuit 22, and the recording process of reading the image data from the memory 30, compressing the data in the compressing and expanding circuit 32, and writing the image data into the storage medium 200 or 210.

Numeral 66 indicates an image display on/off switch, which permits setting of on/off of the image display part 28.

This function enables power saving by shutting off the current supply to the image display part consisting of the TFT LCD or the like in photography using the optical finder 104.

Numeral 70 designates an operation part of various buttons and the like, which include a menu button, a set button, a macro button, a flash setting button, a single shot/continuous shooting/self timer switching button, a menu movement+(plus) button, a menu movement−(minus) button, a reproduced image movement+(plus) button, a reproduced image−(minus) button, a zoom operation button, and so on. In the present embodiment, particularly, the apparatus is configured to detect input through the above switches and operation part, judge the switch operations in the system control circuit 50, and take action to perform the operations designated by the buttons.

Numeral 80 denotes power supply control means, which is comprised of a battery detecting circuit, a DC—DC converter, a switching circuit for switching blocks to be energized, and so on and which is configured to detect a loading/unloading state of a battery, a type of the battery, and the remaining quantity of the battery, control the DC—DC converter, based on the detection result and a command from the system control circuit 50, and supply a necessary voltage to each part including the storage media for a necessary period.

Numeral 82 represents a connector, 84 a connector, and 86 power supply means consisting of a primary battery such as an alkali battery, a lithium battery, or the like, a secondary battery such as an NiCd battery, an NiMH battery, an Li battery, or the like, an AC adapter, and so on.

Numerals 90 and 94 are interfaces to storage media such as a memory card, a hard disk, and the like, numerals 92 and 96 connectors for connection with the storage media such as the memory card, the hard disk, and so on, and numeral 98 storage medium load/unload detection means for detecting whether the storage media 200 or 210 is loaded at the connector 92 and/or 96.

The present embodiment is described on the assumption that there are two systems of interfaces and connectors for loading of storage media. It is a matter of course that the number of the systems of interfaces and connectors for loading of storage media can be any number, one or two or more. The apparatus may also be configured with a combination of interfaces and connectors complying with different standards.

The interfaces and connectors may be those complying with the standards of PCMCIA cards, CF (compact flash) cards, and so on.

When the interfaces 90 and 94 and the connectors 92 and 96 are those complying with the standards of PCMCIA cards, CF (compact flash) cards, etc., various communication cards such as a LAN card, a modem card, an USB card, an IEEE1394 card, a P1284 card, an SCSI card, a communication card such as a PHS card or the like, etc., can be connected to the apparatus, whereby the apparatus can exchange the image data or management information attached thereto with another computer or with a peripheral device such as a printer or the like.

Numeral 104 indicates an optical finder, which permits photography using only the optical finder, without use of the electronic finder function through the image display part 28. Placed in the optical finder 104 are part of the functions of the display device 54, for example, the focus indication, the hand shake warning indication, the flash charge indication, the shutter speed indication, the aperture value indication, the exposure correction indication, and so on.

Numeral 110 denotes communication means, which has various communication functions of RS232C, USB, IEEE1394, P1284, SCSI, modem, LAN, radio communication, and so on.

Numeral 112 designates a connector for connection of the image processing apparatus 100 through the communication means 110 with another device, or an antenna in the case of radio communication.

Numeral 200 represents a storage medium such as a memory card, a hard disk, or the like.

The storage medium 200 is comprised of a storing part 202 consisting of a semiconductor memory, a magnetic disk, or the like, an interface 204 to the image processing apparatus 100, and a connector 206 for connection with the image processing apparatus 100.

Numeral 210 indicates a storage medium such as a memory card, a hard disk, or the like. The storage medium 210 is comprised of a storing part 212 consisting of a semiconductor memory, a magnetic disk, or the like, an interface 214 to the image processing apparatus 100, and a connector 216 for connection with the image processing apparatus 100.

Figure 2:
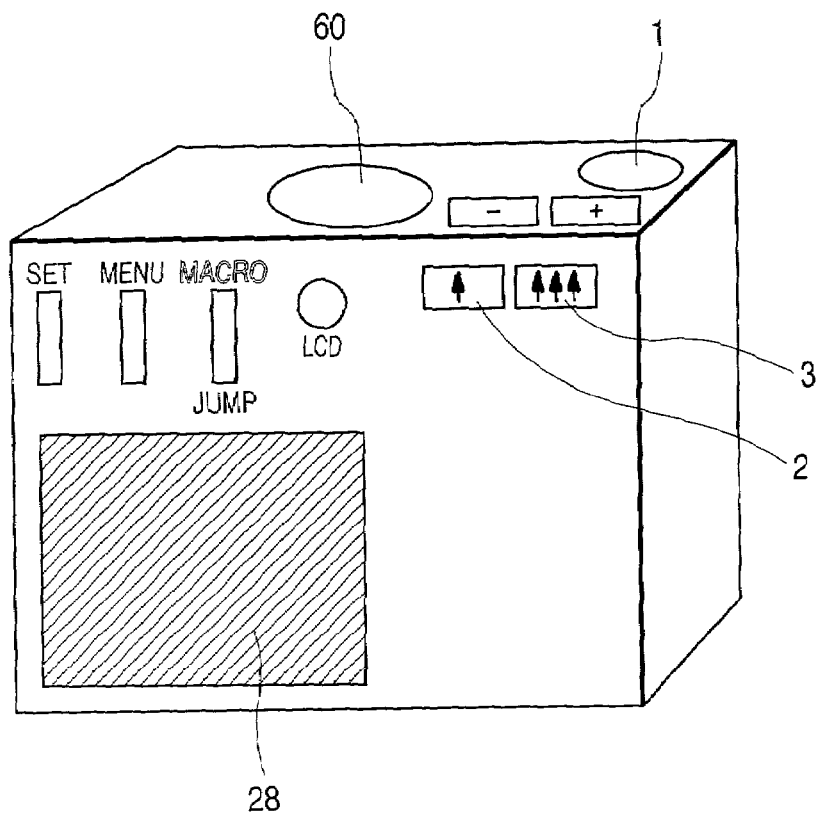
FIG. 2 is a perspective view showing an external view of the image taking apparatus of FIGS. 1A and 1B.

FIG. 2 is a perspective view showing the external view of the image taking apparatus of FIGS. 1A and 1B.

Numeral 60 designates the mode dial switch of FIG. 1B described previously, which permits setting of each function mode by switching among power off, the automatic photography mode, the photography mode, the panorama photography mode, the reproduction mode, the PC connection mode, and so on. Numeral 1 denotes the aforementioned shutter button. Numeral 28 represents the aforementioned image display part of FIG. 1B, which is normally constructed of an LCD (liquid crystal display) and which will be thus referred to hereinafter as the LCD. A screen for editing, setting, etc., for automatic reproduction is also displayed on this LCD 28. Numerals 2 and 3 are buttons for manipulation of zooming in the aforementioned operation part 70 of FIG. 1B, which are buttons for movement toward the tele-photo side and toward the wide side, respectively. The buttons will be described hereinafter as a tele-photo button and a wide button. The present embodiment will be described on the assumption that the magnification of the electric zoom function can be set to either of 1.2×, 1.4×, 1.6×, 1.8×, and 2.0×.

The tele-photo button and wide button are set to change the optical zoom function and the electric zoom function according to the rules described below, thereby permitting implementation of the first embodiment of the present invention.

When the tele-photo button is depressed in a state in which the electric zoom is inactive and in which the optical zoom is not positioned at the tele-photo end, the optical zoom is driven to the tele-photo side.

While the tele-photo button 2 is kept being depressed in the state in which the electric zoom is inactive and in which the optical zoom is not positioned at the tele-photo end, the optical zoom is kept being driven to the tele-photo side. When the optical zoom arrives at the tele-photo end as a result, the drive of the optical zoom is terminated. Even if the tele-photo button 2 is kept being depressed as it is, there is no action taken against the operation.

In the inactive state of the electric zoom and with the optical zoom at the tele-photo end, when the tele-photo button 2 is again depressed, the electric zoom (1.2×) is set (or enabled).

When the tele-photo button 2 is depressed in the active state of the electric zoom and with the electric zoom magnification being not maximum (2.0×), or when the tele-photo button 2 is kept being depressed, the electric zoom magnification is stepped up by one magnification level.

When the tele-photo button is depressed in the active state of the electric zoom and with the electric zoom magnification being maximum (2.0×), no action is taken against the tele-photo button 2.

When the wide button 3 is depressed in the active state of the electric zoom and with the electric zoom magnification being not minimum (1.2×), or when the wide button 3 is kept being depressed, the electric zoom magnification is stepped down by one magnification level.

When the wide button 3 is depressed or kept being depressed in the active state of the electric zoom and with the electric zoom magnification being minimum (1.2×), the electric zoom is canceled (or disabled). When the button is further depressed or kept being depressed, the optical zoom is driven to the wide side.

Figure 3:
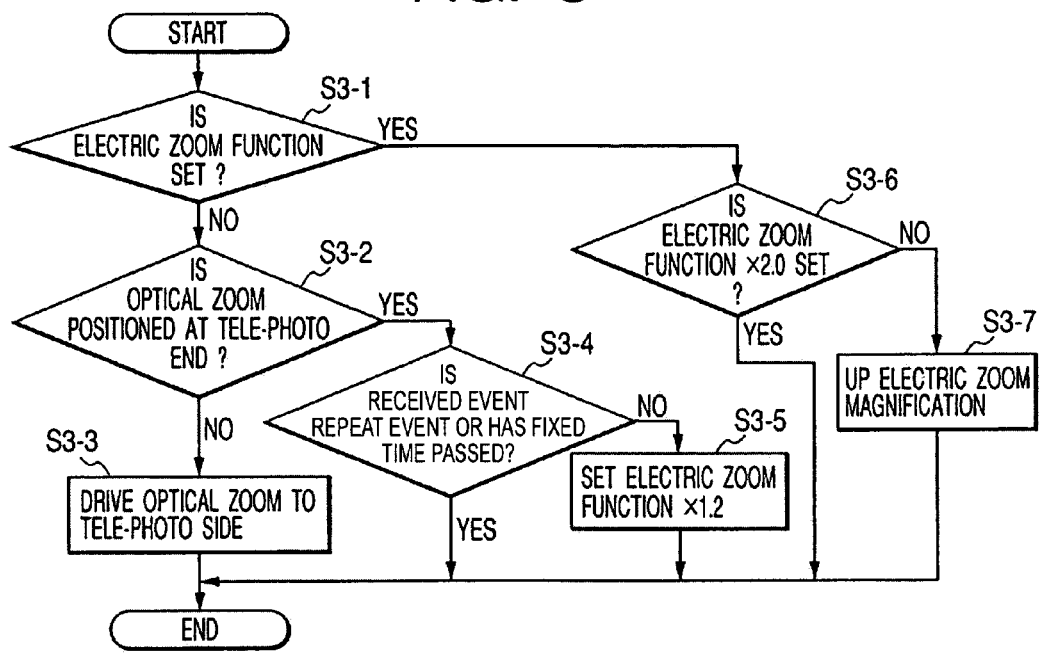
FIG. 3 is a flowchart of processing in the image taking apparatus of FIGS. 1A and 1B.
Figure 4:
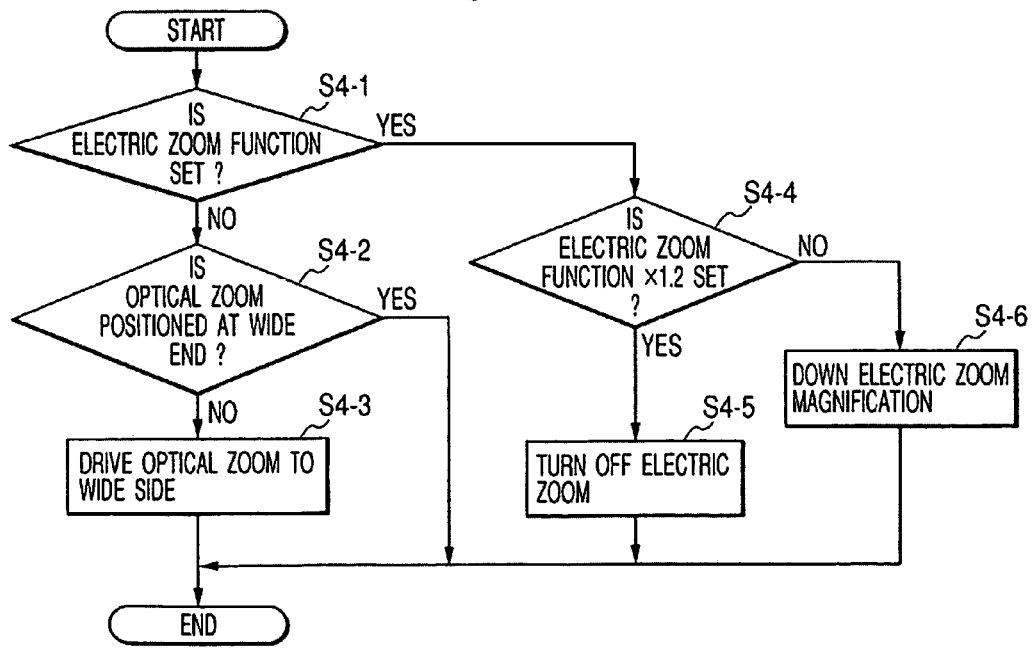
FIG. 4 is a flowchart of processing in the image taking apparatus of FIGS. 1A and 1B.

Described below with reference to FIGS. 3 and 4 are the flows of processing for making a judgment on the electric zoom, the optical zoom, and the switching between them upon depression of the tele-photo button 2 or the wide button 3.

At the first step, the user depresses the tele-photo button 2 or the wide button 3 in a photographable state, and the operation part 70 and the system control circuit 50 then determine which button was pressed. In either of the case where either the tele-photo button 2 or the wide button 3 is depressed from its free state and the case where the same button is kept singly being depressed for a predetermined period of time, an event occurs in the system control circuit 50 to take an action against the button, and the button event is passed to the processing in FIGS. 3 and 4.

When the button event is passed, additional information is also simultaneously passed for notifying that the event has occurred either because of the depression of the button from the free state or because of the continuous depression of the same button. The event having occurred because of the continuous depression of the button will be sometimes referred to hereinafter as a repeat event in particular.

When the button event is that of the tele-photo button 2, the event is passed to the processing in FIG. 3. It is first determined at S3-1 whether the electric zoom function is currently set. When the electric zoom function is inactive herein, it is determined at S3-2 whether the optical zoom is positioned at the tele-photo end. When the optical zoom is not positioned at the tele-photo end, the optical zoom is driven to the tele-photo end side at S3-3 as it is.

When the optical zoom is already located at the tele-photo end, it is determined whether the event passed at that time is the repeat event (S3-4). When it is the repeat event, the processing is ended without any operation. When it is not the repeat event, the electric zoom function (1.2×) is set at S3-5. When the electric zoom function is already set active at S3-1, the electric zoom magnification is checked at S3-6. When the electric zoom magnification is maximum, the processing is ended without any operation. When the electric zoom magnification is not maximum, the magnification is changed to a magnification of a next higher level at S3-7.

When the event occurred is that of the wide button 3, it is passed to the processing in FIG. 4. When the electric zoom function is not set at the determination of S4-1, it is determined at S4-2 whether the optical zoom is positioned at the wide end. When it is not at the wide end, the optical zoom is driven to the wide side. When the electric zoom function is set active, it is determined at the process of S4-4 whether the electric zoom magnification is minimum. When it is minimum, the electric zoom function is canceled at the process of S4-5. When it is not minimum, the electric zoom magnification is changed to a magnification of a next lower level at the process of S4-6.

It is apparent that the present invention can be carried out by provision of the operation method and processing described above.

As described above, the present embodiment permits the switching operation between the optical zoom function and the electric zoom function to be configured so that the function for the prevention of wrong an incorrect operation is provided for the setting of the electric zoom function from the optical zoom area and so that the simpler operation can effect the cancellation of the electric zoom function and return into the optical zoom area, thereby substantiating the image taking apparatus with excellent expediency and high reliability.

Second Embodiment

Although the first embodiment was described on the assumption that the magnifications of the electric zoom were the five steps of 1.2× to 2.0× at maximum, the present invention allows any setting for the magnifications of the electric zoom, the number of steps thereof, the magnifications of the optical zoom, and the number of steps thereof.

The first embodiment was configured to require the operation of again depressing the tele-photo button for transition from the optical zoom area into the electric zoom area, but the processing can be modified, for example, so that at S3-4 the flow proceeds to the process of S3-5 if a fixed time has passed since previous zooming, instead of the determination at S3-4 to determine whether the event is the repeat event. This processing requires longer depression of the tele-photo button as means for preventing the wrong operation in transition from the optical zoom area into the electric zoom area.

In this way the present invention permits the means for preventing the an incorrect operation in the transition from the optical zoom area into the electric zoom area to be realized by various means including those other than the exemplified means.

The present invention also allows combination of the above embodiments or their technical elements as occasion may demand.

The present invention may be applied to any structure wherein the whole or part of the configurations of the claims or embodiments form one apparatus, is combined with another apparatus, or constitute an element making an apparatus.

The present invention can be applied to the image taking apparatus of various forms including the electronic cameras such as video cameras or the like capable of taking moving pictures or still pictures, silver-film cameras using films, single-lens reflex cameras, lens shutter cameras, monitoring cameras, and so on; optical apparatus, other apparatus, apparatus applied to such image taking apparatus, optical apparatus, and other apparatus; elements constituting these apparatus, and control methods and control programs applied to these apparatus.

What is claimed is:

1. An apparatus comprising:
   (A) an image taking unit which takes an image of an object; and
   (B) an image magnification changing unit which permits a first change operation of optically changing magnifications of the image taken by said image taking unit and a second change operation of changing the magnifications by signal processing, said image magnification changing unit imposing a predetermined restriction that is not imposed on transition from the second change operation to the first change operation, on transition from the first change operation to the second change operation,
   wherein said image magnification changing unit sets a longer time for keeping an operation member for the first change operation being operated, which is necessary for the transition from the first change operation to the second change operation, than a time for keeping an operation member for the second change operation being operated, which is necessary for the transition from the second change operation to the first change operation.

* * * * *

UNITED STATES PATENT AND TRADEMARK OFFICE
CERTIFICATE OF CORRECTION

| | |
|---|---|
| PATENT NO. | : 7,113,209 B2 |
| APPLICATION NO. | : 10/062516 |
| DATED | : September 26, 2006 |
| INVENTOR(S) | : Asada |

It is certified that error appears in the above-identified patent and that said Letters Patent is hereby corrected as shown below:

ON THE TITLE PAGE:
At Item (56), References Cited, Foreign Patent Documents:

"JP 10042183 A * 2/1998" should read --JP 10-42183 A * 2/1998--;
"JP 08275042 A" should read --JP 8-275042 A--;
"JP 03198481 A" should read --JP 3-198481 A--; and
"JP 06086131 A" should read --JP 6-86131 A--.

COLUMN 7:
Line 61, "wrong" should be deleted.

Signed and Sealed this

First Day of July, 2008

JON W. DUDAS
*Director of the United States Patent and Trademark Office*